Patented Jan. 19, 1932

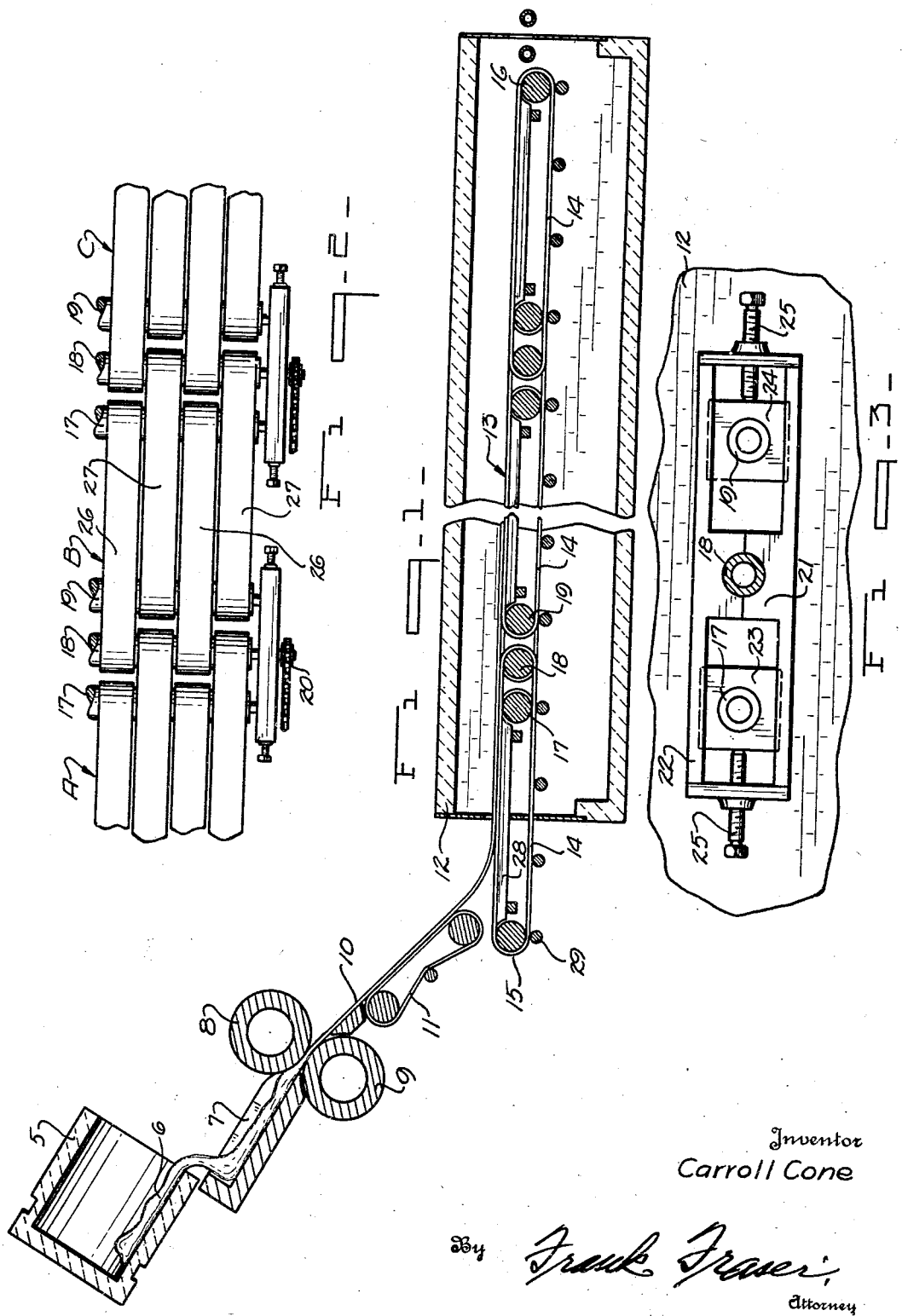

1,841,714

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed November 30, 1929. Serial No. 410,721.

The present invention relates to sheet glass apparatus and has more particular reference to a novel form of conveyor for use therein.

An important object of the invention is to provide a conveyor for sheet glass apparatus so constructed that a sheet of glass in a semi-plastic condition may be carried thereby without danger of the sheet sagging or being otherwise injured.

Another object of the invention is to provide a conveyor for sheet glass apparatus so constructed that it will present a substantially unbroken supporting surface upon which the sheet may be carried without injury thereto.

A further object of the invention is to provide a conveyor composed of a plurality of endless belts, bands or the like so arranged that a substantially solid sheet supporting surface will be formed thereby.

Still another object of the invention is to provide a conveyor constructed of a plurality of endless belts, bands or the like associated with one another in such a manner as to reduce the gaps therebetween to a minimum, means being also provided for adjusting the tension of the said belts, bands or the like to maintain them taut and prevent them from sagging.

Other objects and advantages of the invention will become more apparent during the course of the following description when taken in connection with the accompanying drawings.

In the drawings forming a part of this application and wherein like numerals are employed to designate like parts throughout the same, Fig. 1 is a fragmentary longitudinal section taken through a form of sheet glass apparatus illustrating the present invention in use, Fig. 2 is a fragmentary plan view of the device, and Fig. 3 is an enlarged view of the mounting for the conveyor rolls.

For the purposes of illustration, the present invention has been shown in connection with a well known type of sheet glass rolling apparatus but it is perfectly obvious that its use is not limited to sheet forming machines of this particular type.

The numeral 5 designates a receptacle containing a mass of molten glass 6 which is deposited upon a suitable receiver 7. The receiver is tiltable and the molten glass is initially deposited thereupon when said receiver is in a substantially horizontal position. The receiver 7 is then tilted to the position indicated in the drawings to cause the glass to be moved between the forming rolls 8 and 9 which function to roll it to a sheet 10 of substantially predetermined and uniform thickness. The sheet is supported as it leaves the forming rolls upon an inclined conveyor 11 and after it leaves this conveyor, the said sheet is deflected into the horizontal plane and passed into and through an annealing leer 12.

Arranged within the annealing leer is the new and improved conveying mechanism provided by the present invention and which is indicated in its entirety by the numeral 13. This conveying mechanism is composed of a plurality of relatively short endless conveyors in the form of belts, bands or the like 14 arranged in an overlapping and intermeshing relationship in a manner to present a substantially unbroken sheet supporting surface. The conveying mechanism 13 includes a pair of end rolls 15 and 16 and a plurality of spaced sets or groups of rolls 17, 18 and 19 which are positioned between the end rolls. The roll 18 of each set or group is preferably positively driven through a sprocket and chain drive 20 and is fixedly journaled at each end in the central bearing portion 21 of a horizontal supporting frame 22. The rolls 17 and 19 are journaled at each end in the movable bearing blocks 23 and 24 respectively, slidably carried by the frame 22 and adjustable by means of the screws 25. By adjusting the screws 25, the endless belts can be maintained taut and prevented from sagging.

In accordance with the present invention, the endless belts, bands or the like 14 are associated with one another in a novel manner as clearly shown in Fig. 2. The endless belts or bands are divided into a plurality of groups A, B, C etc. dependent upon the length of conveyor desired, each group consisting of a preferred number of belts depending upon the width of conveyor desired. Certain of the endless belts are rotatably carried by the rolls 18 and 17 while others are carried by the rolls 18 and 19. Thus, referring more particularly to the section B, the belts 26 are trained about the rolls 17 and 18, while the alternate belts 27 are trained about the rolls 18 and 19. By so arranging the several belts of each section with respect to the belts of the adjacent sections, a substantially unbroken sheet supporting surface will be provided. The belts of the forward end section are trained about the rolls 15 and 17 and others about the rolls 15 and 18. On the other hand, the belts of section C are trained about the end rolls 16 and 18 and others about the rolls 16 and 19. The upper flights or runs of the conveyor belts are supported upon stationary tables or the like 28 while the lower flights are supported by a plurality of rolls 29. It will be apparent from the above that each belt is trained about at least one of the positively driven rolls 18 so that the belts will be driven through frictional contact therewith. The conveyor belts may be of metal links, wire mesh, flexible sheet metal or any other suitable highly polished material.

As the sheet of glass 10 leaves the forming rolls 8 and 9, it is in a more or less semi-plastic condition and for this reason, it is highly desirable that the conveying mechanism provided for receiving and carrying the sheet through the leer present a substantially unbroken sheets supporting surface so as to prevent the sheet from sagging and assist in the flattening thereof. By the construction as herein described, it will be readily apparent that the sheet can be carried through the entire annealing leer without fear of the sheet sagging or becoming otherwise marred, this being rendered possible by the overlapping and intermeshing arrangement of the conveyor belts or sections. While the conveying mechanism herein provided has been shown as extending entirely through the leer, it will be apparent that it may be positioned only at the intake end of the leer to support the sheet until it has been substantially set after which it can be passed onto a plurality of rollers. The conveying mechanism herein provided may also be used in any place where it is desired to support a newly formed glass sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A conveyor comprising successive conveyor sections, each section including a plurality of endless belts arranged side by side, the belts of adjacent sections being arranged in overlapping parellel relation and the belts of all of said sections being arranged in alignment with one another, and means for driving said belts.

2. A conveyor comprising successive conveyor sections, each section including a plurality of endless belts arranged side by side, the belts of each section being of substantially the same length and arranged in staggered relation with respect to one another transversely of the conveyor, the belts of all of said sections being in alignment with one another, and means for driving said belts.

3. A conveyor comprising successive conveyor sections, each section including a plurality of endless belts arranged side by side, the belts of each section being of substantially the same length and each belt of each section projecting at one end beyond the adjacent belts of said section, the projecting end portions of the belts of one section overlapping the projecting end portions of the belts of the adjacent section, the belts of the several sections being arranged in alignment with one another, and means for driving said belts.

4. A conveyor comprising a plurality of rolls arranged in a plurality of spaced groups, each group including a fixed roll and a movable roll on each side thereof, successive conveyor sections each including a plurality of endless belts arranged side by side, every other belt of each section being trained about the fixed roll of one group and a movable roll of an adjacent group, the remaining belts of said section being trained about a movable roll of the first group and about the fixed roll of the second group, and means for driving said fixed rolls.

5. A conveyor comprising a plurality of rolls arranged in a plurality of spaced groups, each group including a fixed roll and a movable roll on each side thereof, successive conveyor sections each including a plurality of endless belts arranged side by side, every other belt of each section being trained about the fixed roll of one group and a movable roll of an adjacent group, the remaining belts of said section being trained about a movable roll of the first group and about the fixed roll of the second group, a horizontal supporting frame positioned at each end of each group of rolls and having a central bearing portion for the fixed roll, horizontally slidable bearing blocks carried by the frame for supporting the movable rolls, and means carried by the frame and engaging the movable bearing blocks for effecting movement thereof toward and away from one another, and means for driving said fixed rolls.

Signed at Toledo, in the county of Lucas and State of Ohio, this 27th day of November, 1929.

CARROLL CONE.